United States Patent [19]
Kuipers et al.

[11] 3,798,604
[45] Mar. 19, 1974

[54] DEVICE FOR CHECKING CORPORAL FUNCTIONS

[75] Inventors: Pieter Geert Kuipers; Jan Albert Meerdink, both of Emmasingel, Eindhoven, Netherlands

[73] Assignee: U.S. Philips Corporation, New York, N.Y.

[22] Filed: Feb. 17, 1969

[21] Appl. No.: 799,620

[30] Foreign Application Priority Data
  Feb. 16, 1968  Netherlands ............ 6802208

[52] U.S. Cl. ............ 340/150, 324/121, 340/213 R
[51] Int. Cl. ............ G08b 23/00, G01r 13/20
[58] Field of Search ........ 340/213 R, 324 R, 324 A, 340/150, 149 R

[56] References Cited
UNITED STATES PATENTS

| 3,234,534 | 2/1966 | Todman | 340/213 |
| R26,207 | 5/1967 | Sylvander | 340/213 X |
| 3,345,625 | 10/1967 | Russell et al. | 340/324 X |
| 3,348,229 | 10/1967 | Freas | 340/324.1 UX |
| 3,375,509 | 3/1968 | Mullarkey | 340/213 |
| 3,469,252 | 9/1969 | Bet | 340/324.1 UX |
| 3,474,438 | 10/1969 | Lauher | 340/324.1 UX |

OTHER PUBLICATIONS

Information Display, "Challenges for Display", Arthur L. Aden Nov./Dec. 1967, pp. 32–34.

*Primary Examiner*—Donald J. Yusko
*Attorney, Agent, or Firm*—Frank R. Trifari

[57] ABSTRACT

A monitoring device comprising an oscilloscope having three inputs connected to three switching members. The first switching member receives signal voltages corresponding to the monitored parameters, whereas the second and third switching members receive upper and lower limit voltages of the signal voltages. The oscilloscope is scanned horizontally and vertically. The signal voltages and the limit voltages are sequentially scanned during each horizontal trace period and are compared with a sawtooth voltage synchronized with the vertical scan of the oscilloscope to produce control pulses that are applied to the oscilloscope beam control grid to intensity modulate same to simultaneously display the signal and limit voltages.

10 Claims, 2 Drawing Figures

PATENTED MAR 19 1974 3,798,604

*INVENTORS*
PIETER G. KUIPERS
JAN A. MEERDINK
BY
Frank R. Trifari
AGENT

DEVICE FOR CHECKING CORPORAL FUNCTIONS

This invention relates to a system for monitoring a plurality of parameters and displaying the monitored information on the screen of a cathode ray tube.

For checking corporal functions in carrying out medical examinations, increasing use is being made of devices by means of which electrical derivations of such functions are measured and can be visibly displayed in usable units. It is often desirable that a number of such devices operate simultaneously, such as, for example, for taking an electrocardiogram and for measuring the blood pressure and the flow rate of blood, the temperature and the frequency of respiration and of the pulse wave. In certain cases, for example, for post-operation patient observation it is particularly important that the indications provided by the devices can easily be surveyed and can simultaneously be observed without the observer changing his position for this purpose.

An object of this physiological observation is not only to display dynamic and analog magnitudes, but also to notice the occurrence of abnormal conditions. Derivations from periodically changing phenomena are usually applied to an oscilloscope so that the variation can be observed on the screen of a cathode-ray tube. The electrocardiogram and the variation of the pulse wave are displayed in this manner.

The analog signals are derived from functions changing only slowly, in a certain rhythm, or arbitrarily. Usually such signals are visibly displayed by means of dial instruments which may be provided with adjustable alarm contact pointers for adjusting limit values.

The ability to survey the overall indications in a quick manner is adversely influenced when using dial instruments because it is necessary to sit comparatively close to the instruments for observation and because a concentrated visual adjustment to each separate instrument is necessary for reading a meter indication on a graduated scale.

For simultaneously and visibly displaying different measuring voltages on the display screen of a cathode-ray tube, cathode-ray oscilloscopes are furthermore in use which are provided with a corresponding number of inputs for applying a number of measuring voltages. Due to a certain array of the signals on the screen of the cathode-ray tube, a clear survey may be obtained but then voltage values which mostly deviate from the applied measuring voltages, although proportional thereto, must be derived in order to render such an array possible. The displayed signals then show the voltage variation, but only a relative judgement with respect to the measured value is possible. The introduction of limit values for judgement results in this case in a further extension of the number of inputs by two inputs for each measuring value so that such a device becomes very voluminous and costly.

An object of the invention is to obviate these drawbacks by providing a device for displaying physiological measuring voltages, a number of which are displayed on the screen of a cathode-ray tube and the examination of which is enhanced, due to a logic array, it also being possible to indicate limit values in a simple manner for each measuring voltage separately. According to the invention the device is provided with an oscilloscope including a cathode-ray tube operating in accordance with the vertical scanning principle and comprising at least one input which is connected to a number of switching members which successively connect the input to a number of measuring voltages during mutually equal periods. The switching members remain in the condition associated with the measured voltage so that each measuring voltage is connected once to the relevant input during the horizontal scanning period of the cathode-ray tube.

When using a two-channel oscilloscope the invention provides the possibility to display a dynamic signal and a succession of analog signals on areas of the screen of the cathode-ray tube separated from top to bottom. In the series of analog signals each signal is represented as a short horizontal line. These lines are connected together by rising or falling connection lines so that the overall signal has the form of a step-like curve in which the height of a step corresponds to the height of the associated measuring voltage to be indicated. The flanks which connect the horizontal line sections are not interesting. The part of the screen of the cathode-ray tube which displays the analog signals is preferably covered by a mask in such a manner that transparent vertical windows separated by opaque strips are obtained which permit of observation of the displayed signals, it being possible for each window to be provided with measuring scales corresponding to the measuring values.

By extending the number of input channels of the oscilloscope, two further inputs may be utilized for applying limit values of the measuring voltages. This is accomplished by using corresponding switching members for connection to the upper and lower limit values associated with each measuring signal.

These limit values indicate the values which are critical for the measuring voltages and which may not be exceeded in normal cases. It is possible to display evenly luminescing areas which areas extend from the limits on either side above and below the measuring range instead of limit values which are visible on the screen as horizontal lines so that the separation becomes much more conspicuous. For displaying these areas the intensity of the electron beam may be reduced so that a clear distinction of the measuring signal is still possible.

The operation of an oscilloscope which is provided with a cathode-ray tube operating in accordance with the principle of vertical scanning for visibly displaying signals is known in itself. The signal applied to an input is compared in a comparator with a reference voltage synchronously increasing with the vertical deflection voltage. As soon as the voltages are equal a very short pulse is generated in the comparator and is applied through an amplifier to the control grid of the cathode-ray tube producing a voltage variation of sufficient magnitude for causing a previously suppressed electron current to produce a light dot on the screen. From the periodic comparison of the measuring voltage and the appplied voltage in the comparator in synchronisation with the vertical deflection frequency, a series of time-dependent pulses are generated which succeed one another with equal intervals for a constant measuring signal and are modulated in time for a measuring signal varying in amplitude.

Therefore light impressions produced by the electron beam on the screen of the cathode-ray tube are in principle punctiform and the visible observation consists of a succession of punctiform impressions which merge into lines in case of sufficiently high frequency of the vertical scanning. In connection with the slow horizontal scanning, the use of a screen having a persistence characteristic is desirable.

In order that the invention may be readily carried into effect it will now be described in detail, by way of example, with reference to the accompanying diagrammatic drawings, in which.

Figure 1:
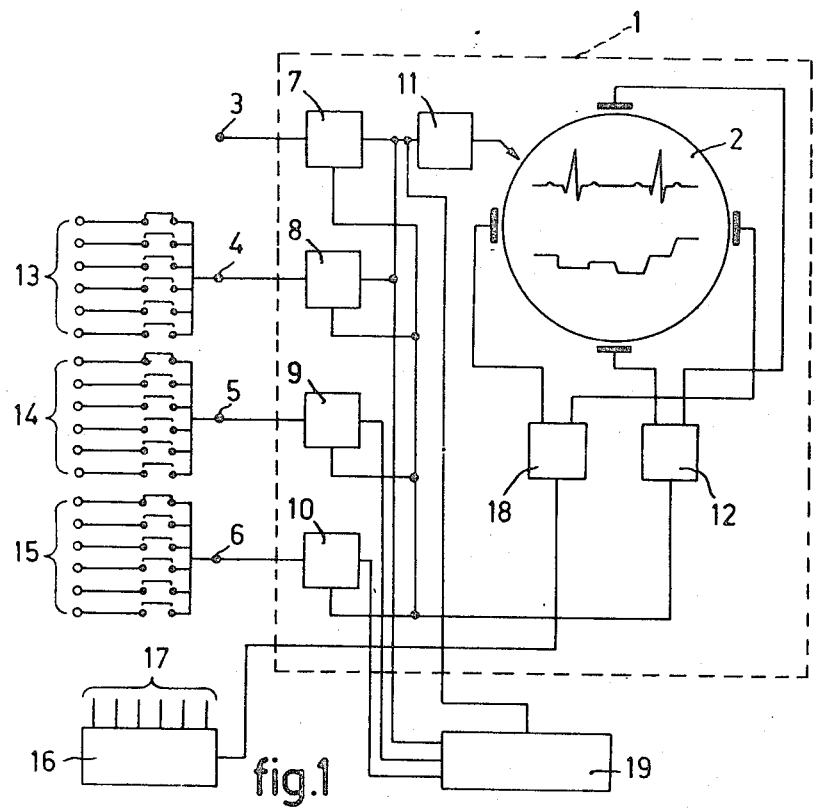
FIG. 1 shows the required electric circuit arrangement.
Figure 2:
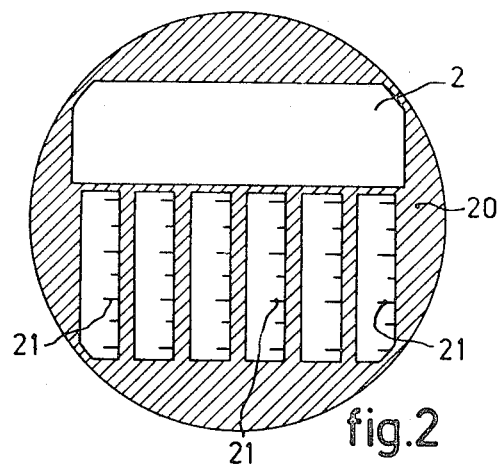
FIG. 2 shows the screen of the cathode-ray tube divided by a mask into a number of measuring fields.

The oscilloscope is indicated by the broken line 1 including the screen 2 of the cathode-ray tube. The oscilloscope has four inputs 3, 4, 5 and 6 each of which is connected to respective comparators 7, 8, 9 and 10. A pulse amplifier 11 serves for further handling of the electrical pulses of these comparators which are applied to the control electrode (not shown) of the cathode-ray tube 2. Each of the comparators 7, 8, 9 and 10 is connected in a current circuit to the sawtooth generator 12 for vertical scanning. For the sake of simplicity, members for electrostatic beam deflection are indicated. The use of electromagnetic deflection is alternatively possible.

Generally a comparator comprises a circuit whose output is controlled by the input signals in synchronism with applied clock or timing pulses, an example of which is found in U.S. Pat. No. 3,102,208. By applying to the comparators a measuring voltage and a voltage which varies in the rhythm of the vertical scanning between a minimum and a maximum value, pulse voltages arise at the outputs having a time sequence which is determined by the values of the measuring voltages.

For a more detailed description of the device it is desirable, with reference to the analog voltages applied to the device, to distinguish between measuring voltages and limit value voltages. The electric voltage directly derived from the physiologic phenomenon to be examined is considered as the measuring voltage which is applied from the relevant measuring instrument to the device. The limit value voltages are applied for bounding an area of permissible values of the measuring voltage, and these may be separately adjustable. Therefore, for each physiologic unit, preferably a measuring voltage and two limit voltages are available for the highest and the lowest measuring values permissible.

A number of these combinations of a measuring voltage and two limit value voltages is applied to contact series 13, 14, 15 which permit, for example, six connections each. The first second, third and following pair of each contact series are simultaneously connected to an input of the device, and consequently the voltages then occurring are applied to the comparators. The contact apertures may, for example, be shunted by so-called quick response magnetic "reed" relays, the magnetic energizing of which is controlled, for example, by a division scanner 16, in this case a six-division scanner which is adapted to apply the energizing current successively through outputs 17 to corresponding relays in each contact series every time during one-sixteenth division of the horizontal scanning period, for which purpose an input of the scanner is connected to the horizontal time base 18. Broadly stated a division scanner comprises a chain of control relays and an electronic timing circuit for generating tuning control pulses serving to trigger an electronic counting circuit for developing a predetermined repeating sequence of output signals which operate the control relays in a predetermined time relationship to the horizontal scanning period. Electronic switching elements may alternatively be used instead of magnetic switches. Consequently the device makes it possible during the horizontal scanning to display successively 6 physiological measuring voltages and the associated high and low limit values on the screen of a cathode-ray tube. By suitable choice of the speed of the horizontal scanning in combination with the persistence characteristic of the screen it may be achieved that the 6 physiological signals are visible simultaneously and continuously. A useful extension of the device consists in that the pulses resulting from the limit value voltages are formed in such a manner that not only a highest and a lowest value are indicated but also adjoining strips extending upwards and downwards respectively may be made luminous on the display screen. To achieve this a combination of electronically active components in a device 19 must be employed for which the name of "alarm logic" might be used. It contains, inter alia, a number of gating circuits which become conducting as regards the highest limit value due to a pulse received from the associated comparator 9, and which return after a given period of time to the original non-conducting condition. A further gating circuit may be adjusted so as to be normally conductive and being reversed to a non-conducting condition by a pulse from the comparator 10 which marks the lowest limit value, and remain in that condition until the beginning of a subsequent vertical scanning. An alarm circuit correspondingly operable for controlling magnitudes provided with means for scanning the magnitudes of a plurality of conditions and having for its object the provision of signalling when a change occurs above or below a predetermined set value together with an indication of the fact that the aforesaid change has occurred is shown in U. S. Pat. No. 3,234,532.

The complex of electrical pulses is applied to pulse amplifier 11 and subsequently to the control electrode of the cathode-ray tube. In the drawing the input 3 is destined for the supply of a dynamic signal which is active during the entire horizontal time base, and the inputs 4, 5 and 6 receive analog signals which are successively passed only during part of the time base.

In conformity therewith the upper part of the screen 2 of the cathode-ray tube is available for the dynamic signal throughout its width (electrocardiogram or pulse wave) after which the other part remains for analog signals. The lower part is covered by a mask 20 in such a manner that 6 transparent vertical scales are obtained which are separated by opaque strips. Measuring scales 21 may be provided on the transparent parts.

To determine whether a measuring value exceeds the associated limit values, the device 19 includes in addition a combination of known so-called "logic" electronic circuits which, for example, determine whether an electrical pulse received from comparator 8 falls or does not fall within the interval formed by the electrical pulses received from the comparators 9 and 10. When one of the limit values is exceeded the above is no longer the case, and device 19 supplies an alarm signal which, for example, closes a relay contact in an internal or external alarm current circuit. For signalling the alarm on the display screen, device 19 may apply one additional electrical pulse for vertical scanning in the case of alarm to the pulse amplifier 11 in such a manner that a luminescent alarm field appears on the display screen, for example, in the space intended for the display of the dynamic signal.

It is possible to cause this alarm field, as viewed in a horizontal direction, to appear only at the area where the relevant measuring signal is also displayed. The device 19 may also comprise means for supplying an acoustic signal when the limit value voltages are exceeded by the measuring voltage.

What is claimed is:

1. A device for monitoring a plurality of parameters and displaying measuring voltages corresponding thereto on the screen of a cathode-ray tube having a beam control electrode comprising, an oscilloscope including said cathode-ray tube, a plurality of inputs and means for quick vertical scanning and for slow horizontal scanning of the display screen of the cathode-ray tube, means connecting at least one of the inputs of the oscilloscope to said beam control electrode and to a number of switching members adapted to receive measuring voltages corresponding to the monitored parameters, means synchronized with the horizontal scanning means for sequentially operating said switching members so as to successively connect the input to a number of measuring voltages during mutually equal periods whereby each measuring voltage is connected once to the relevant input during a horizontal scanning period to vary the intensity of the cathode ray tube electron beam, and wherein the oscilloscope includes two further inputs, a corresponding number of switching members connected to said two further inputs and adapted to be connected to electric voltages which indicate a high and a low limit value of the respective measuring voltages, and wherein the latter switching members are operated in synchronism with the former switching members by said sequential operating means whereby the latter switching members are successively connected to said limit voltages.

2. A device as claimed in claim 1 further comprising means responsive to said limit voltages for varying the intensity of the CRT electron beam so as to cause parts of the display screen of the cathode-ray tube to luminesce, which parts are located on either side of the measuring range enclosed by the limit values.

3. A device as claimed in claim 2 wherein the beam varying means comprises pulse extension circuits which are controlled by a limit value voltage.

4. A device as claimed in claim 1 further comprising circuit means for coupling said switching members to the beam intensity control electrode of the cathode ray tube, said circuit means including means for displaying the measuring voltage at a greater intensity than the intensity used for displaying the limit value voltages.

5. A device as claimed in claim 1 further comprising a device coupled to said switching members which includes means for producing an alarm indication when the measuring voltage exceeds one of the limit value voltages.

6. A device as claimed in claim 5 wherein the alarm producing means includes means coupled to the beam control electrode for producing a light spot on the display screen to provide the alarm indication.

7. A device as claimed in claim 1 further comprising a mask disposed on the front side of the display screen and including vertical opaque sections arranged to separate the displayed measuring voltages.

8. A device as claimed in claim 1 further comprising first, second and third signal comparison devices, means individually connecting a first input of said comparison devices to said three inputs of the oscilloscope, means connecting said vertical scanning means to a second input of each of said comparison devices, and means connecting an output electrode of each comparison device to the beam intensity control electrode of the cathode ray tube.

9. A device as claimed in claim 8 further comprising an alarm device having an input coupled to the output electrodes of said first, second and third comparison devices and an output electrode coupled to said beam control electrode to apply a voltage pulse thereto whenever the measuring voltage exceeds the upper or lower values of the limit voltages.

10. A device for monitoring a plurality of parameters and displaying measuring voltages corresponding thereto on the screen of a cathode-ray tube having a beam control electrode comprising, an oscilloscope including said cathode-ray tube, a plurality of inputs and means for quick vertical scanning and for slow horizontal scanning of the display screen of the cathode-ray tube, means connecting at least one of the inputs of the oscilloscope to said beam control electrode and to a number of switching members adapted to receive measuring voltages corresponding to the monitored parameters, means synchronized with the horizontal scanning means for sequentially operating said switching members so as to successively connect the input to a number of measuring voltages during mutually equal periods whereby each measuring voltage is connected once to the relevant input during a horizontal scanning period to vary the intensity of the cathode ray tube electron beam, and said connecting means includes signal comparison means having first and second inputs coupled to said oscilloscope input and to said vertical scanning means, respectively, and an output coupled to the beam intensity control electrode of the cathode ray tube to apply a pulse type signal thereto which unblanks the electron beam upon equality of the voltages appearing at said first and second inputs.

* * * * *